US011125636B2

(12) United States Patent
Johnston et al.

(10) Patent No.: US 11,125,636 B2
(45) Date of Patent: Sep. 21, 2021

(54) QUADRATURE DETECTION FOR OPTICAL MEMS PRESSURE GAUGE

(71) Applicants: William Albert Johnston, Houston, TX (US); Alexander Michael Barry, Cypress, TX (US)

(72) Inventors: William Albert Johnston, Houston, TX (US); Alexander Michael Barry, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 486 days.

(21) Appl. No.: 16/002,752

(22) Filed: Jun. 7, 2018

(65) Prior Publication Data
US 2019/0376861 A1 Dec. 12, 2019

(51) Int. Cl.
*G01L 9/00* (2006.01)
*G01L 19/04* (2006.01)

(52) U.S. Cl.
CPC ............ *G01L 9/0079* (2013.01); *G01L 19/04* (2013.01)

(58) Field of Classification Search
CPC .............................. G01L 9/0079; G01L 19/04
See application file for complete search history.

(56) References Cited

U.S. PATENT DOCUMENTS

| | | | | |
|---|---|---|---|---|
| 4,897,542 A | * | 1/1990 | Dakin | G01D 5/268 250/227.21 |
| 5,275,053 A | * | 1/1994 | Wlodarczyk | G01L 9/0077 250/227.14 |
| 5,929,990 A | * | 7/1999 | Hall | G01L 9/0079 356/519 |
| 2007/0041019 A1 | | 2/2007 | Schmidt | |
| 2007/0089522 A1 | * | 4/2007 | Kinugasa | G01L 9/0079 73/705 |
| 2007/0089524 A1 | | 4/2007 | Walchli et al. | |
| 2013/0329232 A1 | | 12/2013 | Antila et al. | |

FOREIGN PATENT DOCUMENTS

WO 2007040762 A1 4/2007

OTHER PUBLICATIONS

International Search Report and Written Opinion for PCT/US2019/035476, dated Sep. 25, 2019; pp. 1-12.

* cited by examiner

*Primary Examiner* — Xin Y Zhong
(74) *Attorney, Agent, or Firm* — Cantor Colburn LLP

(57) ABSTRACT

A method and apparatus for measuring a pressure. A pressure gauge includes a first plate having a resonant frequency related to a pressure at the pressure gauge. The first plate is thermally-excited at a selected frequency, and a sensor measures a first power level of a first light having a first wavelength reflected from the first plate and a second power level of a second light having a second wavelength reflected from the first plate. A processor determines a thermal drift in the resonant frequency of the first plate due to the thermal excitation of the first plate from the first power level and the second power level, corrects a pressure measurement determined from the resonant frequency of the first plate for the thermal drift of the resonant frequency, and operates a device based on the pressure measurement.

9 Claims, 5 Drawing Sheets

QUADRATURE DETECTION FOR OPTICAL MEMS PRESSURE GAUGE

BACKGROUND

The present disclosure is directed to a method and apparatus for measuring a pressure and, in particular, to a method and apparatus for correcting for a temperature dependence of an optical microelectromechanical (MEMS) pressure gauge using optical reflection.

Various oil exploration operations require determining a pressure at a downhole location in a wellbore. Pressure sensors used downhole need to be able to endure the high pressures and high temperatures of a downhole environment. One such durable pressure sensor is an optical microelectromechanical (MEMS) pressure gauge. The optical MEMS pressure gauge includes a Fabry-Perot (FP) interferometer element with two opposing faces separated by a gap. The MEMS pressure gauge contains a MEMS resonator that once set into motion causes this FP gap length to oscillate. The pressure at the optical MEMS pressure gauge can be determined by measuring the oscillations in the amplitude of a wavelength of light passed by the FP element. One problem with the optical MEMS pressure gauge is that at least one face of the FP element can expand and contract with temperature, causing temperature-induced error in the pressure measurements. In addition, the resonant frequencies of the MEMS element change depending on temperature causing additional error in pressure measurements. Therefore, there is a need to determine a temperature-dependence of the optical MEMS pressure gauge in order to remove temperature-induced error from the pressure measurements.

BRIEF DESCRIPTION

In one aspect of the present disclosure, a method of measuring a pressure includes: thermally exciting a first plate of a Fabry-Perot interferometer to oscillate at a selected frequency; measuring a first power level of a first light reflected from the first plate, the first light having a first wavelength; measuring a second power level of a second light reflected from the first plate, the second light having a second wavelength; and determining a thermal drift in a resonant frequency of the first plate due to the thermal excitement of the first plate from the first power level and the second power level; and correcting a pressure measurement related to the resonant frequency of the first plate for the thermal drift in the resonant frequency; and operating a device based on the pressure measurement.

In another aspect of the present disclosure, an apparatus for measuring a pressure includes: a first interrogation light source for generating a first light having a first wavelength; a second interrogation light source for generating a second light having a second wavelength; a pressure gauge including a first plate having a resonant frequency related to a pressure at the pressure gauge; a sensor for measuring a first power level of the first light reflected from the first plate of the pressure gauge and a second power level of the second light reflected from the first plate, wherein the first plate is thermally-excited at a selected frequency; and a processor configured to: determine a thermal drift in the resonant frequency of the first plate due to the thermal excitation of the first plate from the first power level and the second power level, correct a pressure measurement determined from the resonant frequency of the first plate for the thermal drift of the resonant frequency, and operate a device based on the pressure measurement.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
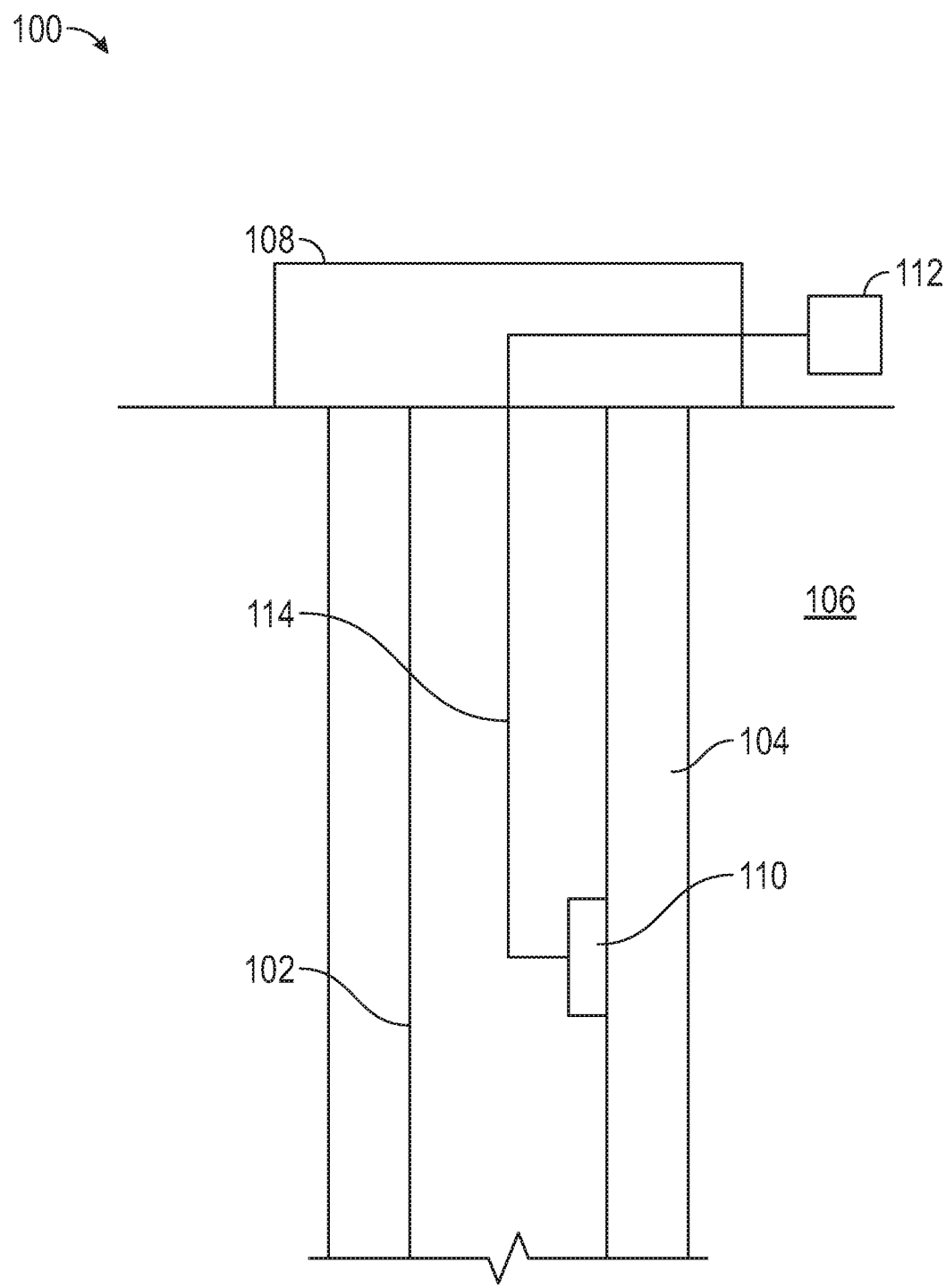
FIG. 1 illustrates a wellbore system 100 including an optical MEMS pressure gauge for measuring pressure downhole.

Referring to FIG. 1, a wellbore system 100 having an optical MEMS pressure gauge 110 for measuring pressure downhole is illustrated. The wellbore system 100 includes a work string 102 disposed within a wellbore 104 in a formation 106. The work string 102 extends into the wellbore 104 from a well head 108 or other surface structure and can be used in various wellbore operations, such as drilling, completion, production, etc. The work string 102 includes at least one pressure sensor disposed at a downhole location. In various aspects, the pressure sensor is an optical microelectromechanical (MEMS) pressure gauge 110. A MEMS probe 112 communicates with the optical MEMS pressure gauge 110 via an optical fiber 114 to obtain pressure measurements. In various embodiments, the pressure measurements can be used to operate various devices, such as to open or close a pressure valve based on the pressure measurement. Also, the optical MEMS pressure gauge 110 can be used as a formation evaluation sensor, with acoustic and/or seismic testing of the formation 106 or to sense pressure of a flow in the wellbore 104. Although discussed herein with respect to a wellbore system 100, it is to be understood that the optical MEMS pressure gauge 110 and the MEMS probe 112 can be used outside of a wellbore and can be used in industries other than wellbore deployment.

Figure 2:
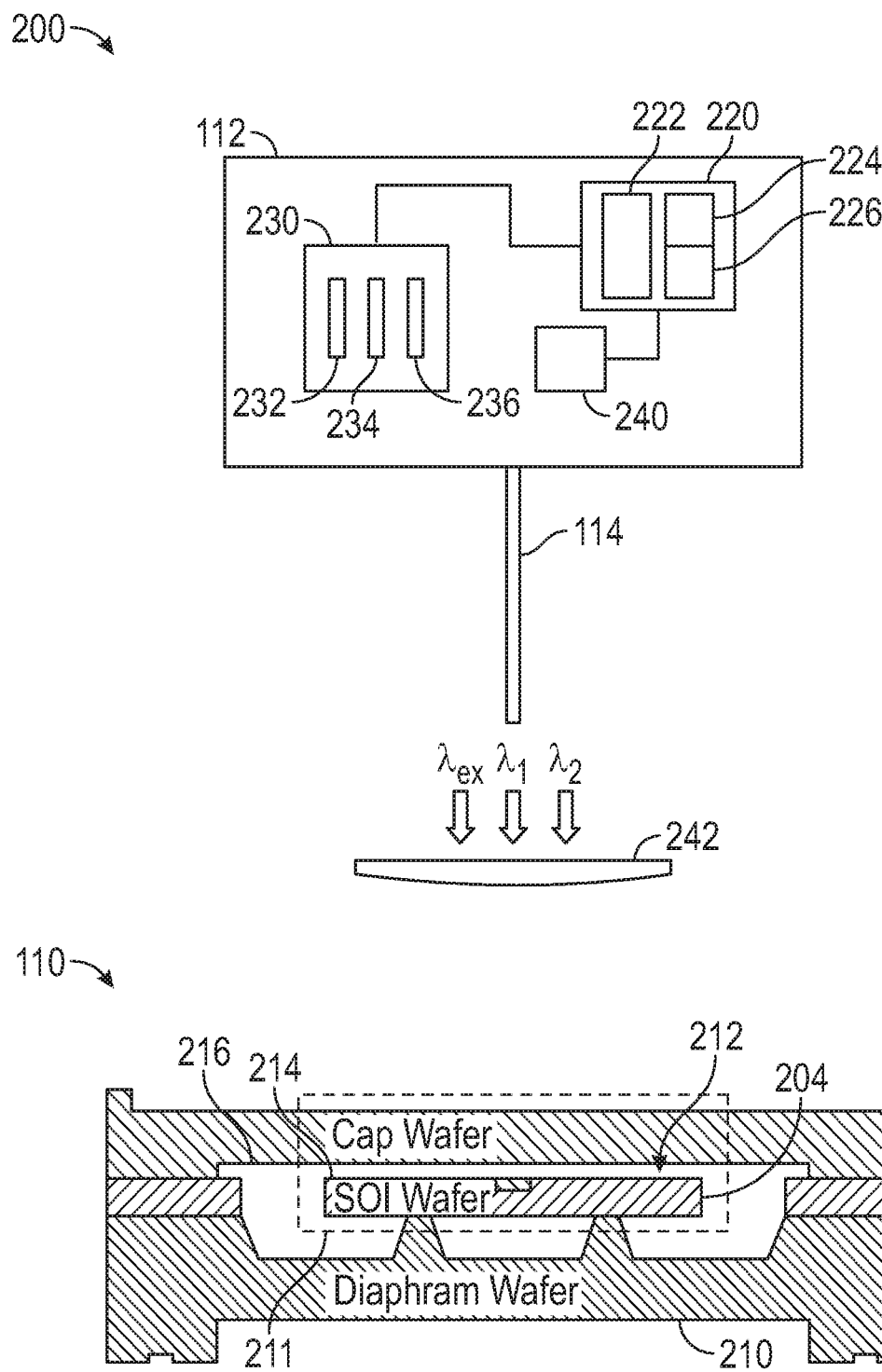
FIG. 2 shows details of a pressure measurement system including the optical MEMS pressure gauge and the MEMS probe of FIG. 1.

The function of the optical MEMS pressure gauge 110 and its evaluation using the MEMS probe 112 is discussed in detail with respect to FIG. 2.

FIG. 2 shows details of a pressure measurement system 200 including the optical MEMS pressure gauge 110 and the MEMS probe 112 of FIG. 1. The optical MEMS pressure gauge 110 includes a diaphragm wafer 202, a Silicon on Insulator (SOI) wafer 204 and a cap wafer 206. The diaphragm wafer 102 includes a support section 208 and a flexible diaphragm 210. The cap wafer 206 is attached to the support section 208 of the diaphragm wafer 202. The SOI wafer 204 is attached to the flexible diaphragm 210 of the diaphragm wafer 202. The SOI wafer 204 and the cap wafer 206 are separated by a gap 212 defined by face 214 of the SOI wafer 204 and face 216 of the cap wafer 206. Faces 214 and 26 oppose each other across the gap 212 to form a Fabry-Perot interferometer element (also referred to herein as an "FP element" 211).

An FP element 211 includes a first plate and a second plate separated by gap 212. In various embodiments of the optical MEMS pressure gauge 110, the SOI wafer 204 serves as the first plate and the cap wafer 206 serves as the second plate. The cap wafer 206 is a transparent plate that is transparent to light at a selected wavelength and thus allows light into and out of the FP element 211. In various embodiments, the cap wafer 206 includes an anti-reflection coating on its surface to reduce thermal oscillations in the cap wafer 206 as light passes through the cap wafer 206. The gap 212 can be a vacuum, air, or filled with a material having a selected index of refraction, in various embodiments. Light entering the FP element 211 is reflected, or partially reflected at the opposing inner surfaces (i.e., faces 214 and 216) to form multiple reflections. For light perpendicular to faces 214 and 216, the multiple reflections cause interference that results in the FP element 211 emitting or passing light at a selected wavelength satisfying the equation 2L=mλ, where L is the length of the gap 212 and λ is the wavelength of light. With the SOI wafer 214 attached to the diaphragm wafer 202, a pressure exerted on the flexible diaphragm 210 affects the length of the gap 212. The SOI wafer 214 is designed to be a high-Q resonator with multiple narrow resonant frequencies. Pressure causes the diaphragm 210 to apply stress to the SOI wafer 214, causing the resonant frequencies of the SOI wafer 210 to change with the pressure at the diaphragm. The vibration of the SIO wafer 24 can be measured by measuring the oscillations of the SOI wafer 214 or oscillations of gap 212. Thus by illuminating the optical MEMS pressure gauge 110 and measuring a wavelength of reflected light, one can determine the length of the gap, the resonant frequencies of the SOI wafer 214, and thereby determine pressure from the resonant frequency.

Still referring to FIG. 1, the MEMS probe 112 includes a control unit 220, a light source 230 and an optical interrogator 240. Control unit 220 control various elements of the MEMS probe 114, including the light source 230 and optical interrogator 240. The control unit 220 includes a processor 222 and a memory storage device 224 that has stored therein various instructions and programs 226 that when read by the processor 222, enable the processor 222 to control the light source 230 and the optical interrogator 240 as well as to perform various calculations for determining a temperature-dependence of the optical MEMS pressure gauge 110 in order to correct pressure measurements obtained by the optical MEMS pressure gauge 110.

The light source 230 includes an excitation light source (excitation laser 232), a first interrogation light source (first interrogation laser 234) and a second interrogation light source (second interrogation laser 236), The excitation laser 232 generates light at an excitation wavelength $\lambda_{ex}$ at which the SOI wafer 204 is absorbent. The excitation laser 232 is amplitude modulated in order to drive the optical MEMS pressure gauge 110 at or near its resonant frequencies. The amplitude modulation formats can include on-off, pulsed, or sine wave amplitude modulations. The first interrogation laser 234 generates light at a first wavelength $\lambda_1$ at which the SOI wafer 204 is reflective, and the second interrogation laser 236 generates light at a second wavelength $\lambda_2$ at which the SOI wafer 204 is reflective.

The optical interrogator 240 includes photodetectors (not shown) for reading light signals. In various embodiments, the optical interrogator 240 receives reflections of the light at the first wavelength $\lambda_1$ of light and the light at the second wavelength $\lambda_2$ from the optical MEMS pressure gauge 110 and provides power measurements associated with these wavelengths to the control unit 220.

An optical fiber 114 extends from the MEMS probe 112 to the optical MEMS pressure gauge 110. The optical fiber 114 serves as an optical medium for transmitting light at the various wavelengths $\lambda_{ex}$, $\lambda_1$ and $\lambda_2$ from the MEMS probe 112 to the optimal MEMS pressure gauge 110 and for transmitting reflected light back to the MEMS probe 112. A collimation lens 242 between the optical fiber and the optical MEMS pressure gauge 110 collimates light from the optical fiber 114 in order to be normally incident to the outer surface of the cap wafer 206 and to direct reflected light from the optical MEMS pressure gauge 110 back into the optical fiber 114.

The FP element 211 of the optical MEMS pressure gauge 110 is sensitive to temperature. In particular, the elastic constants of the SIO wafer 214 are temperature dependent, which causes the MEMS resonant frequency to change with temperature. Therefore, interrogating the optical MEMS pressure gauge 110 with light leads to drifts in the frequencies of the sensor's resonant modes as well as causes the working point of the FP element to drift, leading to weak signals and harmonic distortion in the detected signals. The methods disclosed herein correct for the effect of temperature on pressure measurements.

In order to determine the effect of temperature on pressure measurements, the SOI wafer 204 is excited at a selected frequency near one of the resonant frequencies of the optical MEMS pressure gauge 210, In one aspect, the MEMS tester 112 operates by activating the excitation laser 232 to generate an excitation light at the excitation wavelength $\lambda_{ex}$ and modulated at the selected frequency while the first interrogation laser 234 and second interrogation laser 236 are operated simultaneously with the excitation laser 232 to obtain optical measurements of reflected signal at from the first interrogation laser 234 and the second interrogation laser 236 off of the FP element 211. In various embodiments, the excitation laser 232 is toggled through multiple 'ON' and 'OFF' states at a selected frequency in order to generate thermally-induced oscillations in the SOI wafer 204. Alternatively, an amplitude of the excitation laser 232 can be modulated according to a selected frequency.

In various embodiments, the excitation laser 232 has a wavelength of 1310 nanometers (nm) and is toggled at a toggle frequency of about 23 kiloHertz (kHz). The wavelengths $\lambda_1$ and $\lambda_2$ are selected to be out of phase by approximately mπ/4 times the gap length of the FP element 211, where m is an odd integer. For a gap length of 21 micron, a suitable combination of wavelengths is $\lambda_1$=1485 nm and $\lambda_2$=1550 nm. Calculations for determining possible optical wavelengths $\lambda_1$ and $\lambda_2$ are discussed with respect to Eqs. (1)-(6).

The wavelength $\lambda_1$ of first interrogation laser 234 with and the wavelength $\lambda_2$ of the second interrogation laser 236 are used to measure both in-phase and quadrature signals of the FP element interferometer are both simultaneously measured. To measure the quadrature signal, one first selects wavelengths $\lambda_1$ and $\lambda_2$ having a phase relation of mπ/4, where m is an odd integer. The amplitude or power level $A_1$ of a reflected signal corresponding to the first interrogation laser 234 is given by Eq. (1):

$$A_1 = \cos[(4\pi n L/\lambda_1)*(1+\varepsilon(t))] \qquad \text{Eq. (1)}$$

where ε(t) contains oscillatory resonances as well as any thermal drift, n is the index of refraction of the FP element, L is the length of the gap of the FP element, and $\lambda_1$ is the wavelength of the first interrogation laser 234. The amplitude or power level $A_2$ of a reflected signal corresponding to the second interrogation laser 236 is given by:

$$A_2 = \cos[(4\pi n L/\lambda_2)*(1+\varepsilon(t))] \qquad \text{Eq. (2)}$$

where $\lambda_2$ is the wavelength of the second interrogation laser 236. These signals are in quadrature when $A_2 = A_1(t,\phi)$, where $$A_1(t,\phi) = \cos[(4\pi n L/\lambda_1)*(1+\varepsilon(t))+\phi] \qquad \text{Eq. (3)}$$

Therefore, the signals are in quadrature when $$\cos[(4\pi n L/\lambda_2)*(1+\varepsilon(t))] = \cos[(4\pi L/\lambda_1)*(1+\varepsilon(t))+\phi] \qquad \text{Eq. (4)}$$

For small $\varepsilon(t)$, Eq. (4) holds when the phase relation is:

$$\phi = 4\pi n L(\lambda_1 - \lambda_2)/(\lambda_2 \lambda_1) \qquad \text{Eq. (5)}$$

Since the phase $\phi = m\pi/4$, $$\lambda_2 = (4\pi n L \lambda_1)/(\lambda_1(m\pi/4) + 4\pi n L) \qquad \text{Eq. (6)}$$

For a first wavelength $\lambda_1 = 1550$ nm and L=21 micrometers, possible wavelengths for $\lambda_2 = 1540, 1521, 1503, 1484, 1467, 1449$.

Once the reflected signals $A_1$ and $A_2$ have been measured, the true phase of the FP element 211 can be calculated using Eq. (7):

$$\phi = \tan^{-1}\left[\frac{A_2}{A_1}\right] \qquad \text{Eq. (7)}$$

Thus, interrogating the optical MEMS pressure gauge 110 at two wavelengths allows for calculation of a true interferometric phase of the FP element 211. This phase is directly proportional to the displacement and/or the thermal drift of the optical MEMS pressure gauge 110, thereby providing a temperature correction to pressure measurements. Using Eq. (7), the calculation of the interferometric phase of the FP element is free from harmonic distortion. In addition, by having two lasers $m\pi/4$ out of phase with each other, signal fading due to drifting of the working point of the FP element 211 is eliminated.

Figure 3:
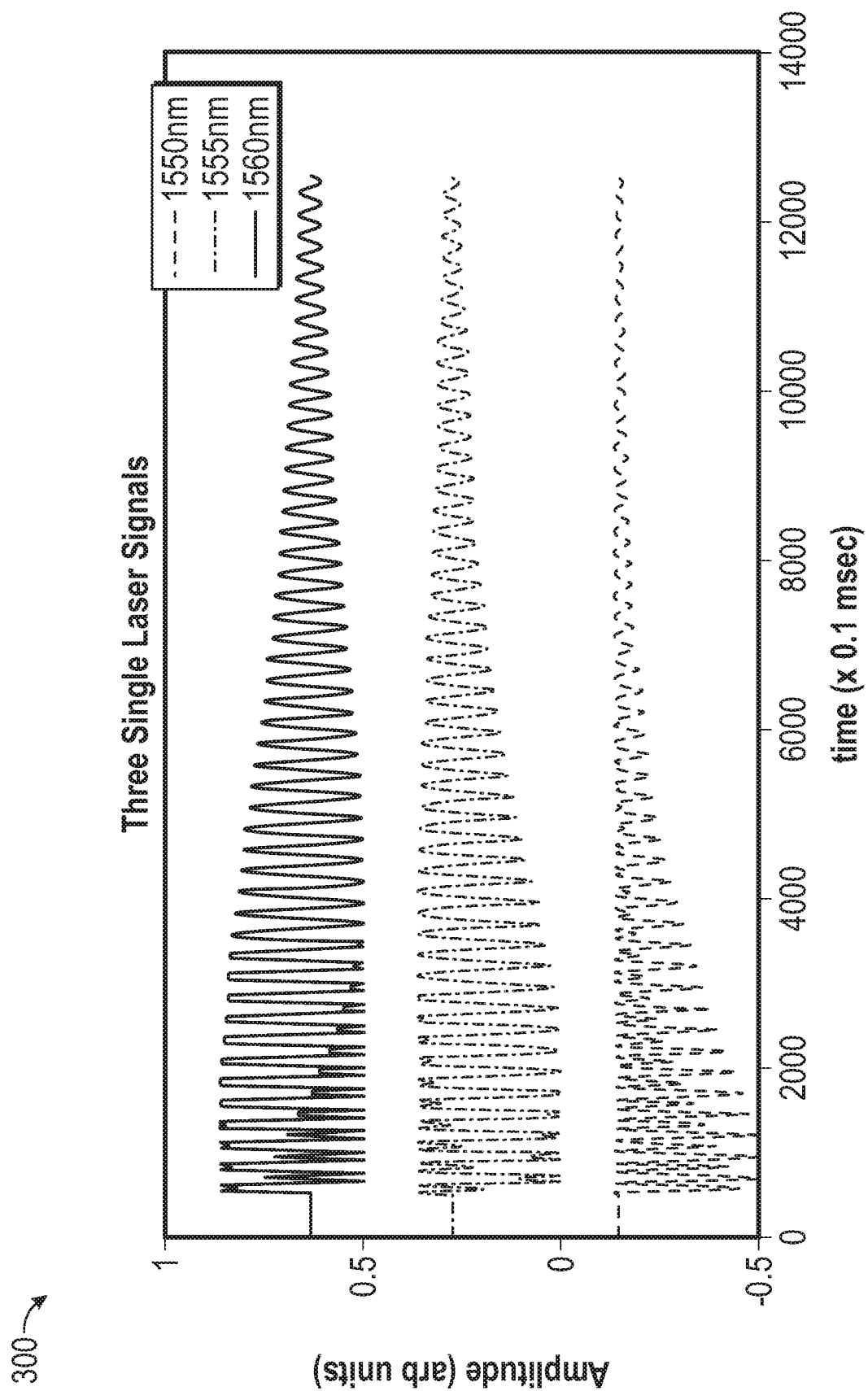
FIG. 3 shows reflected signal response for three different interrogation laser wavelengths.

FIG. 3 shows reflected signal responses 300 for three different interrogation laser wavelengths (e.g., 1550 nm, 1555 nm, 1560 nm) as the power from excitation laser 232 is turned off. Time is shown along the abscissa in milliseconds and amplitude or power level is shown along the ordinate axis in arbitrary units. The signals includes a fundamental waveforms that are due to the thermal excitation of the FP element 211. Each signal includes harmonic distortions, which are significant at early times. The signal at 1550 nm has harmonic distortion that dies out by about 400 msec. The signal at 1555 nm has harmonic distortion that dies out by about 350 msec. The signal at 1560 nm has harmonic distortion that dies out by about 600 msec.

Figure 4:
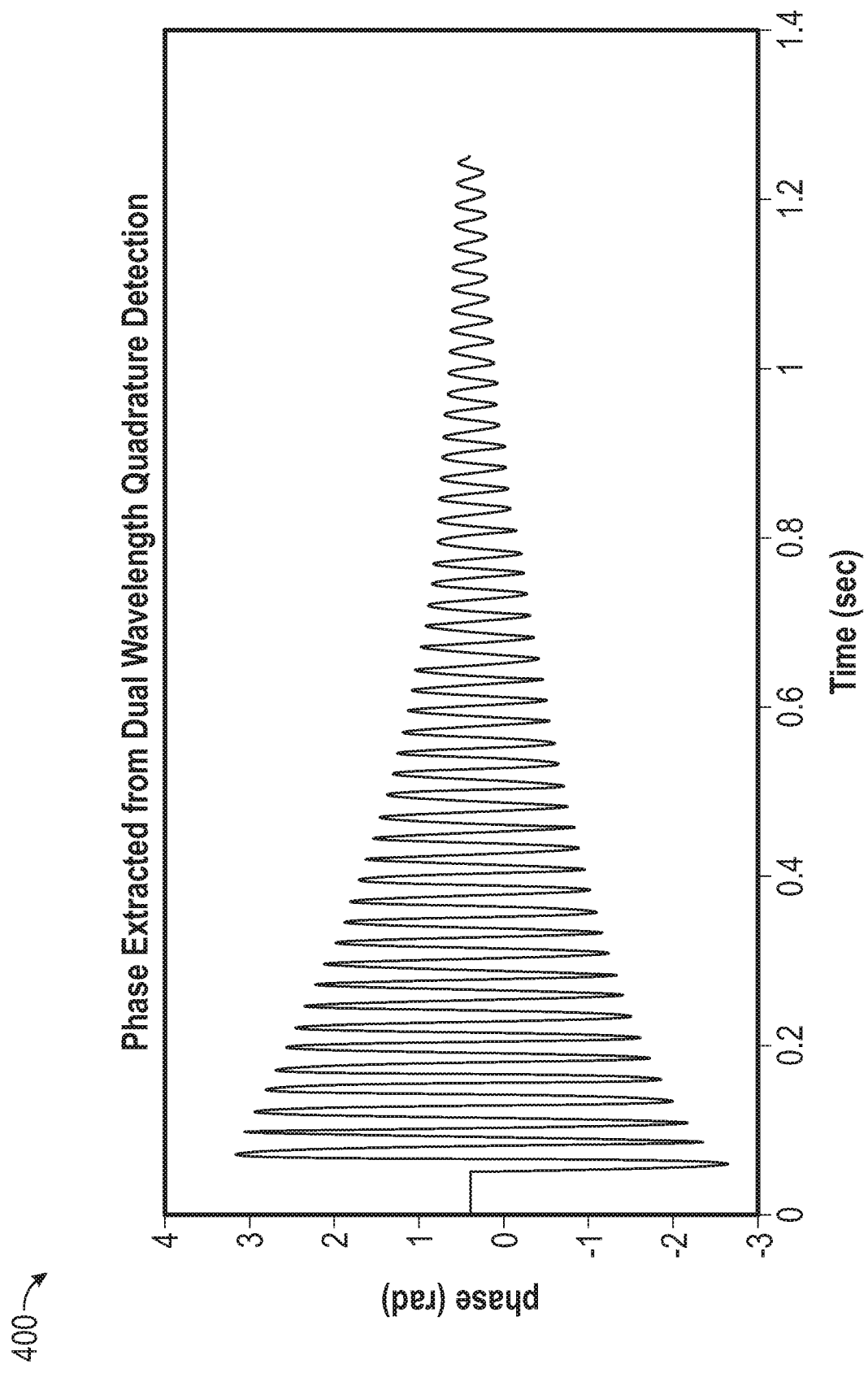
FIG. 4 shows a phase determined from a ration of two signals from FIG. 3.

FIG. 4 shows a phase 400 determined from a ratio of two signals from FIG. 3. In particular, FIG. 4 shows the phase $\phi$ of Eq. (7) determined using the signals for $\lambda_1 = 1550$ nm and $\lambda_2 = 1560$ nm. The ratio is free of harmonic distortion, even at early times, and can therefore be used to relate the temperature of the FP element 211 (i.e., temperature of the SOI wafer 204) to phase displacement, thereby provided a thermal correction to pressure measurements made by the FP element 211 since the displacement of the sensor is directly related to the amount of energy input from excitation laser 232.

Figure 5:
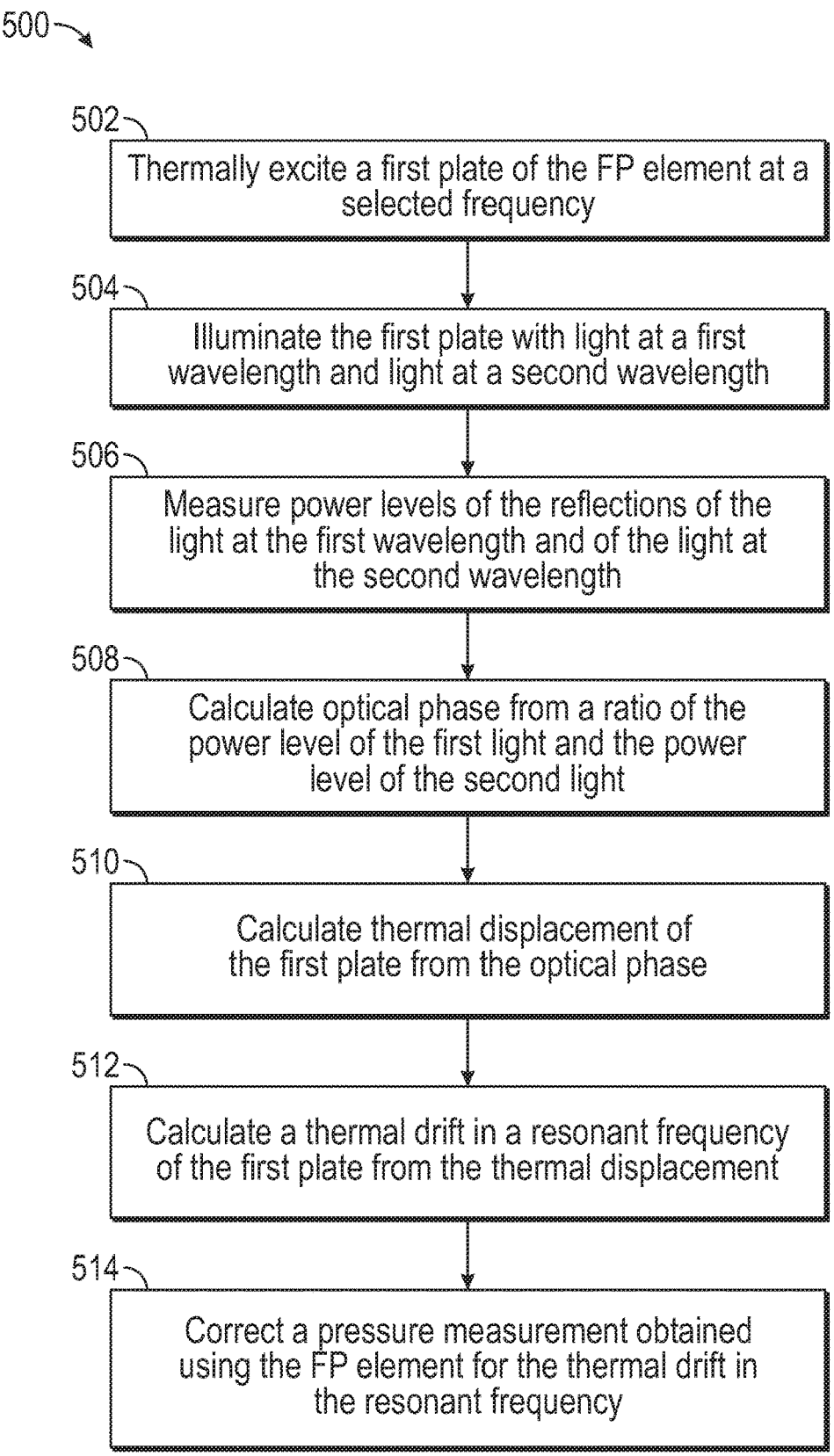
FIG. 5 shows a flowchart illustrating a method for determining a thermal correction to pressure measurements obtained using an optical MEMS pressure gauge which includes an FP element.

FIG. 5 shows a flowchart 500 illustrating a method for determining a thermal correction to pressure measurements obtained using an optical MEMS pressure gauge 110 which includes an FP element 211. In box 502, a first plate of the FP element 211 is thermally excited at a selected frequency. The thermal excitation of the first plate can be due to illuminating the first plate by an excitation laser or excitation light source that is toggled ON/OFF at a selected frequency. In box 504, the first plate is illuminated by a first interrogation laser or first interrogation light source at a first wavelength and a second interrogation laser or second interrogation light source at a second wavelength.

In box 506, power levels of the reflections of the light at the first wavelength and of the light at the second wavelength is measured are measured. In box 508, an optical phase is calculated from a ratio of the power level of the first light and the power level of the second light. In box 510, a thermal displacement of the first plate is determined from the optical phase, and in box 512, a thermal drift in a resonant frequency of the first plate is determined from the thermal displacement. In box 514, a pressure measurement obtained using the FP element 211 is corrected for thermal drift in resonant frequency.

Set forth below are some embodiments of the foregoing disclosure:

Embodiment 1

A method of measuring a pressure, comprising: thermally exciting a first plate of a Fabry-Perot interferometer to oscillate at a selected frequency; measuring a first power level of a first light reflected from the first plate, the first light having a first wavelength; measuring a second power level of a second light reflected from the first plate, the second light having a second wavelength; and determining a thermal drift in a resonant frequency of the first plate due to the thermal excitement of the first plate from the first power level and the second power level; and correcting a pressure measurement related to the resonant frequency of the first plate for the thermal drift in the resonant frequency; and operating a device based on the pressure measurement.

Embodiment 2

The method as in any prior embodiment, further comprising determining the thermal drift from a ratio of the first power level and the second power level.

Embodiment 3

The method as in any prior embodiment, further comprising determining a change in an optical phase between the first light and the second light from the ratio of the first power level and the second power level, and determining the thermal drift from the optical phase.

Embodiment 4

The method as in any prior embodiment, wherein the Fabry-Perot interferometer includes the first plate and a second plate separated from the first plate by the gap, the method further comprising passing the first light and the second light through the second plate to reflect off of the first plate.

Embodiment 5

The method as in any prior embodiment, further comprising thermally exciting the first plate using an excitation laser.

Embodiment 6

The method as in any prior embodiment, further comprising one of: (i) toggling the excitation laser toggled on and off at the selected frequency; and (ii) sinusoidal modulation of an amplitude of the excitation laser.

Embodiment 7

The method as in any prior embodiment, wherein a phase difference between the first wavelength and the second wavelength is $m\pi/4$ where m is an odd integer.

Embodiment 8

An apparatus for measuring a pressure, comprising: a first interrogation light source for generating a first light having a first wavelength; a second interrogation light source for generating a second light having a second wavelength; a pressure gauge including a first plate having a resonant frequency related to a pressure at the pressure gauge, a sensor for measuring a first power level of the first light reflected from the first plate of the pressure gauge and a second power level of the second light reflected from the first plate, wherein the first plate is thermally-excited at a selected frequency; and a processor configured to: determine a thermal drift in the resonant frequency of the first plate due to the thermal excitation of the first plate from the first power level and the second power level, correct a pressure measurement determined from the resonant frequency of the first plate for the thermal drift of the resonant frequency, and operate a device based on the pressure measurement.

Embodiment 9

The apparatus as in any prior embodiment, wherein the processor is further configured to determine the thermal drift from a ratio of the first power level and the second power level.

Embodiment 10

The apparatus as in any prior embodiment, wherein the processor is further configured to determine a change in an optical phase between the first light and the second light from the ratio of the first power level and the second power level, and determine the thermal drift from the optical phase.

Embodiment 11

The apparatus as in any prior embodiment, wherein the pressure gauge includes a Fabry-Perot interferometer having the first plate and a second plate separated from the first plate by the gap, wherein the first light source and the second light source direct their respective light onto the first plate through the second plate.

Embodiment 12

The apparatus as in any prior embodiment, wherein the second plate includes an anti-reflective coating on a surface.

Embodiment 13

The apparatus as in any prior embodiment, further comprising an excitation light source configured to thermally excite the first plate.

Embodiment 14

The apparatus as in any prior embodiment, wherein one of (i) the excitation light source is toggled on and off at the selected frequency and (ii) an amplitude of the excitation light source is modulated in a sinusoidal pattern.

Embodiment 15

The apparatus as in any prior embodiment, wherein a phase difference between the first wavelength and the second wavelength is $m\pi/4$ where m is an odd integer.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of measuring a pressure, comprising:
thermally exciting a first plate of a Fabry-Perot interferometer to oscillate at a selected excitation frequency using an excitation light from an excitation laser;
measuring a first power level of a first interrogation light reflected from the first plate, the first interrogation light having a first wavelength;
measuring a second power level of a second interrogation light reflected from the first plate, the second interrogation light having a second wavelength; and
determining a change in an optical phase between the first interrogation light and the second interrogation light due to the thermal excitement of the first plate from a ratio of the first power level and the second power level;
determining a thermal drift in a resonant frequency of the first plate due to the thermal excitement from the optical phase;
correcting a pressure measurement related to the resonant frequency of the first plate for the thermal drift in the resonant frequency; and
operating a device based on the pressure measurement.

2. The method of claim 1, wherein the Fabry-Perot interferometer includes the first plate and a second plate separated from the first plate by the gap, the method further comprising passing the first interrogation light and the second interrogation light through the second plate to reflect off of the first plate.

3. The method of claim 1, further comprising one of:
(i) toggling the excitation laser toggled on and off at the selected excitation frequency; and (ii) sinusoidal modulation of an amplitude of the excitation laser.

4. The method of claim 1, wherein a phase difference between the first interrogation wavelength and the second interrogation wavelength is $m\pi/4$ where m is an odd integer.

5. An apparatus for measuring a pressure, comprising:
an excitation light source for generating an excitation light at an excitation frequency;
a first interrogation light source for generating a first interrogation light having a first wavelength;
a second interrogation light source for generating a second interrogation light having a second wavelength;
a pressure gauge including a first plate having a resonant frequency related to a pressure at the pressure gauge;
a sensor for measuring a first power level of the first interrogation light reflected from the first plate of the pressure gauge and a second power level of the second interrogation light reflected from the first plate, wherein the first plate is thermally-excited at the selected excitation frequency by the excitation light; and
a processor configured to:
determine a change in an optical phase between the first interrogation light and the second interrogation light due to the thermal excitation of the first plate from a ratio of the first power level and the second power level,
determine a thermal drift in a resonant frequency of the first plate due to the thermal excitement from the optical phase:
correct a pressure measurement related to the resonant frequency of the first plate for the thermal drift in the resonant frequency, and
operate a device based on the pressure measurement.

6. The apparatus of claim 5, wherein the pressure gauge includes a Fabry-Perot interferometer having the first plate and a second plate separated from the first plate by the gap, wherein the first light source and the second light source direct their respective light onto the first plate through the second plate.

7. The apparatus of claim 5, wherein the second plate includes an anti-reflective coating on a surface.

8. The apparatus of claim 5, wherein one of:
(i) the excitation light source is toggled on and off at the selected excitation frequency and (ii) an amplitude of the excitation light source is modulated in a sinusoidal pattern.

9. The apparatus of claim 5, wherein a phase difference between the first wavelength and the second wavelength is $m\pi/4$ where m is an odd integer.

* * * * *